United States Patent Office 2,987,505
Patented June 6, 1961

2,987,505
COMPOSITIONS OF POLYMERIC N-VINYL-2-OXAZOLIDONE AND HALOGENS
Jesse Werner, Holliswood, N.Y., assignor to General Aniline & Film Corporation, New York, N.Y., a corporation of Delaware
No Drawing. Filed Mar. 4, 1958, Ser. No. 718,998
8 Claims. (Cl. 260—77.5)

This invention relates to improved novel compositions containing halogens and polymeric N-vinyl-2-oxazolidone.

I have discovered that polymeric N-vinyl-2-oxazolidone in combination with halogens and inorganic substances derived from and containing halogens or capable of setting free halogens in solution materially lowers the toxicity and sensitizing effects of the halogens on animal life without affecting, and in fact, in many cases enhancing the killing effect of such halogen compounds on micro-organisms, i.e. bacteria, yeasts, molds, fungi, etc.

This discovery makes possible the formulation of a wide variety of compositions containing such halogen compounds in conjunction with polymeric N-vinyl-2-oxazolidone which are of value in substantially the same use as the unmodified halogen compounds but are free of many of the objectionable properties of such unmodified halogen compounds and thus may be employed with greater safety than the unmodified compounds and in more effective concentrations.

The novel halogen compounds of the present invention have bactericidal, germicidal and fungicidal uses. Such combination or complex has decreased toxicity and substantially less irritation and sensitizing effects than the halogen compounds per se, and in many cases showing a synergistic effect. Moreover, such combination, depending upon the particular halogen compound used, may be employed for local application as germicides and antiseptics to the skin, in ointments, creams, jellies, suppositories and the like. In addition to decreasing the toxicity and irritation and sensitization effects of the halogen compounds, it has been found that the presence of polymeric N-vinyl-2-oxazolidone substantially prolongs the application of the halogen when it is used therapeutically or otherwise in situ.

The polymeric N-vinyl-2-oxazolidone which I have found useful in combination with halogens and halogen containing compounds is characterized by the following general formula:

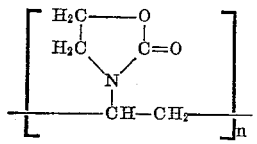

wherein $n$ represents the extent of polymerization as indicated by the molecular weight which may range from 1,000 to 100,000. It is prepared by the polymerization of N-vinyl-2-oxazolidone by the conventional methods using a polymerization catalyst, such as benzoyl peroxide or azobisisobutyronitrile. The preparation of N-vinyl-2-oxazolidone is accomplished by the dihydrochlorination of N(beta-chloroethyl)oxazolidone with metallic potassium in tertiary butyl alcohol or by the reaction of sodium methylate with the 2-chloroethyl ester of 2-chloroethyl carbamic acid in tetrahydrofuran as solvent, as is more fully described in the Journal of Organic Chemistry, volume 22, pages 849 to 851, July 1957.

While for certain purposes a polymer of a particular weight range may be desired, the detoxifying effect does not appear to be related to the molecular weight and the range of molecular weight of a particular polymer to be employed in any given application will be governed by considerations other than this detoxifying action. Such considerations are well known in the art and the proper choice of polymer may readily be made. For external use the molecular weight of the polymer appears to be without effect save for its effect on the viscosity of the composition.

The present invention will first be described in detail in connection with its use with inorganic irritating forms of halogens. Thus the addition of a small amount of polymeric N-vinyl-2-oxazolidone to elemental iodine was effective in decreasing the toxicity of iodine solutions very substantially. The inorganic forms of iodine with which polymeric N-vinyl-2-oxazolidone may be used include elemental iodine, Lugol's solution, colloidal iodine suspensions, alkali and alkaline earth salts of iodine, iodides, iodates and iodites, acids of iodine such as HI and HIO, and iodine halides such as iodine monochloride and iodine monobromide.

It was found that in such combinations of iodine, iodine halides, etc. and polymeric vinyl-2-oxazolidone the acute toxicity of iodine and iodine halide was materially lowered. The irritation and sensitization effects of iodine were substantially absent in iodine-polymeric vinyl-2-oxazolidone combinations. The objectionable staining properties of the iodine were overcome, and the odor of iodine was not noticeable. At the same time, it was noted that the presence of a polymeric vinyl-2-oxazolidone in the composition did not effect the bactericidal function of the iodine as free elemental iodine and, in fact, it was found that combinations of iodine and polymeric vinyl-2-oxazolidone were more active bactericidally in some uses than free iodine itself. It was found that while there was no conclusive evidence of any chemical combination between the iodine and the polymeric vinyl-2-oxazolidone it appears that such combination possesses distinctive properties which possibly may be due to the formation of a new form of matter. Thus when a small amount of polymeric vinyl-2-oxazolidone is added to Lugol's solution and the thus formed mixture heated on a steam bath, a starch test for iodine could not be obtained on paper suspended over the bath and no odor of iodine could be detected.

In comparison with Lugol's solution, polymeric vinyl-2-oxazolidone iodine mixture showed at various dilutions, zones of inhibition several times as large as those formed by Lugol's solution at the same dilution.

This novel combination of polymeric N-vinyl-2-oxazolidone and iodine is, as indicated previously, readily prepared by mixing a solution of polymeric N-vinyl-2-oxazolidone in a solvent such as methanol, ethanol, or methylene chloride with a solution of iodine in a similar solvent. An aqueous solution of polymeric N-vinyl-2-oxazolidone may be added to an aqueous solution of iodine such as Lugol's solution followed by mixing, preferably by adding the solution of polymeric N-vinyl-2-oxazolidone to Lugol's solution since mixing is readily effected when addition is in this order, while when the converse order or addition is used, there is a tendency for a precipitate to be formed and difficulty may be encountered in obtaining a uniform composition. The thus obtained mixed solutions which contain the polymeric N-vinyl-2-oxazolidone-iodine combination may be used as such or, if desired, may be dried and the dry powder used as such. This dry powder is readily soluble in water and may be dissolved for use, if desired.

It has also been found that the polymeric N-vinyl-2-oxazolidone appears to act as solvent for iodine and the novel complex or combination of polymeric N-vinyl-2-oxazolidone and iodine of the present invention may be prepared by intimately mixing (for example, by grinding in a mortar and pestle or in a ball or pebble mill) elemental iodine, iodine monochloride, iodine monobromide, etc., and the dry polymer. Such dry mixtures are as readily dissolved in water as the polymer used in producing them and it has been found that polymeric N-vinyl-2-oxazolidone ground with iodine until as high as 25 percent by weight of iodine is incorporated therein forms a homogenous solution in water from which iodine is not precipitated by further dilution. In the case of iodine monochloride a complex is obtained containing about 20% total iodine and 7% total chlorine. With iodine monobromide a complex is formed containing about 15% available iodine and 9–10% available bromine.

It has also been found that by heating a dried mixture of polymeric N-vinyl-2-oxazolidone and elemental iodine while stirring the same or grinding in a ball mill that the iodine may be completely blended with the polymeric N-vinyl-2-oxazolidone so that a stable homogenous composition in which the iodine is completely combined with the polymeric N-vinyl-2-oxazolidone is obtained in a short time.

The novel compositions of the present invention, i.e., "complex" of polymeric N-vinyl-2-oxazolidone and halogen may be used either in dried form or in solution, aqueous solutions generally being preferred on account of their cheapness. From a practical standpoint, it is frequently preferable to obtain the product in the dry form and dissolve it in water at the point of use. However, both the solution and dry form of the novel "complex" of the composition of the present invention have wide fields of application.

A 10% solution of polymeric N-vinyl-2-oxazolidone containing about 5% iodine based on the polymeric N-vinyl-2-oxazolidone has been found to be valuable as general antiseptic for first-aid and other purposes (both skin wounds and deep wounds).

The novel polymeric N-vinyl-2-oxazolidone iodine compositions of this invention are suitable for optical application in treatment of diseases and infections produced by bacteria, viruses, and fungi infections of the skin. Both the dried compositions themselves and aqueous solutions may be used on any surface of the body. In addition, the novel iodine polymeric N-vinyl-2-oxazolidone compositions of this invention may be incorporated in the solutions, powders, ointments, jellies, suppositories, etc., used for topical application.

The polymeric N-vinyl-2-oxazolidone iodine compositions of the present invention are not limited to any concentration. In general, based on dry weights of polymeric N-vinyl-2-oxazolidone and iodine, at least about 5% iodine to 95% polymeric N-vinyl-2-oxazolidone is preferred since this concentration has been found to be non-toxic. Compositions containing larger amounts of iodine up to 10 to 15% by weight based on the weight of polymeric N-vinyl-2-oxazolidone have also been found to be substantially non-toxic and non-irritating.

The complexes of iodine monochloride and iodine monobromide may be employed as disinfectants, sterilants and deodorants in industrial and sanitary applications.

Where the novel compositions of the present invention are intended for use in general sanitizing, larger amounts of iodine may be incorporated in polymeric N-vinyl-2-oxazolidone. It has been found that up to 35% iodine can readily be incorporated in polymeric N-vinyl-2-oxazolidone and, when this composition is dissolved in water, iodine is not precipitated on dilution. It may also be desirable to prepare polymeric N-vinyl-2-oxazolidone iodine compositions of the present invention containing relatively large amounts of iodine, say 15 to 25%, which are mixed with iodine-free polymeric N-vinyl-2-oxazolidone or an iodine-free solution of polymeric N-vinyl-2-oxazolidone to produce a solution having the desired iodine content. Once the iodine polymeric N-vinyl-2-oxazolidone composition of the present invention has been produced, it is readily soluble in water and further amounts of polymeric N-vinyl-2-oxazolidone may readily be added thereto.

In certain respects the polymeric N-vinyl-2-oxazolidone halogen compositions of this invention may be considered as a novel form of water soluble iodine, iodine halides, etc. so as to obtain an aqueous solution of iodine, iodine halide, etc., in which the mammalian toxicity is substantially reduced.

The novel polymeric N-vinyl-2-oxazolidone iodine and iodine halogen compositions of the present invention may be formulated with a wide variety of surface active agents such as anionic surface agents such as soaps or alkylaryl sulfates and sulfonates, higher fatty alcohol sulfates and sulfonates; cationic surface agents such as quaternary ammonium surface active agents, and non-ionic surface active agents such as polyglycol ethers of alkyl phenols, and higher fatty alcohols or the polyglycol ether esters of higher fatty acids to produce valuable, cleaner sanitizers which have a wide field of application in cleaning and sanitizing operations, by washing, bathing, spraying, etc.

The following examples will serve to show how the various halogen polymer compositions or complexes may be prepared. It is to be understood, however, that these examples are merely illustrative and are not to be construed as limitative of the invention disclosed and claimed.

Example I 12 grams of dry polymeric N-vinyl-2-oxazolidone of average molecular weight approximately 15,000 were added to 6 grams of solid iodine crystals in a glass bottle containing a few pebbles and beads. This was rolled for three days on a roller mill with occasional manual stirring to loosen the material caked on the sides of the bottle. Analysis showed that the resulting product contained 35.4% total iodine. The material was heat-treated at 95° C. for 64 hours in a closed glass bottle with occasional stirring. On completion of this treatment, analysis showed that the material contained 35.3% total iodine.

Example II

The same procedure as in Example I was repeated using 12 grams of dry polymeric N-vinyl - 2 - oxazolidone of average molecular weight approximately 4,000. On completion of the mixing, analysis showed that the product contained 29.0% available iodine. On heat treatment of this material for 64 hours, analysis showed that the product contained 31.9% total iodine.

Example III 10 grams of polymeric N-vinyl-2-oxazolidone having a molecular weight of 20,000 and 2–3 grams of iodine monochloride were mixed at room temperature in a glass container until a homogenous reddish-orange product was formed. The resulting product showed excellent bleaching and sterilizing activity.

Example IV

Example III was repeated with the exception that the iodine monochloride was replaced by an equivalent amount of iodine monobromide. The resulting reddish-brown product showed excellent deodorizing and disinfecting properties.

I claim:

1. A stable halogen complex of polyvinyl-2-oxazolidone wherein the said polyvinyl-2-oxazolidone has a molecular weight of 1,000 to 100,000 and wherein the halogen content of the said complex ranges from 5–35.3% by weight thereof and the said halogen is selected from the group consisting of iodine, iodine monochloride and iodine monobromide, said complex prepared by grinding a dry mixture of the soid polyvinyl-2-oxazolidone with 5–35.3 parts by weight thereof of said halogen, followed by a heat treatment of the ground complex in a closed container at a temperature of 95° C.

2. A stable halogen complex according to claim 1 wherein the halogen is iodine.

3. A stable halogen complex according to claim 1 wherein the halogen is iodine monochloride.

4. A stable halogen complex according to claim 1 wherein the halogen is iodine monobromide.

5. The method of preparing a halogen complex of polyvinyl-2-oxazolidone which consists uniformly dispersing by grinding a dry mixture of polyvinyl-2-oxazolidone having a molecular weight of 1,000 to 100,000 with 5 to 35.3% based on the weight of said oxazolidone of a halogen compound selected from the group consisting of iodine, idoine monochloride and iodine monobromide, followed by a heat treatment of the ground complex in a closed container at a temperature of 95° C.

6. The method according to claim 5 wherein the halogen compound is iodine.

7. The method according to claim 5 wherein the halogen compound is iodine monochloride.

8. The method according to claim 5 wherein the halogen compound is iodine monobromide.

References Cited in the file of this patent

UNITED STATES PATENTS

| | | |
|---|---|---|
| 2,706,701 | Beller et al. | Apr. 19, 1955 |
| 2,739,922 | Shelanski | Mar. 27, 1956 |
| 2,786,043 | Schuller et al. | Mar. 19, 1957 |
| 2,853,417 | Werner et al. | Sept. 23, 1958 |

OTHER REFERENCES

Dreschel: "Jour. of Organic Chem.," vol. 22, July, 1957, pp. 849–851.